Aug. 1, 1967   J. V. TAVANO, SR   3,333,880
CRASH ABSORBING DEVICE
Filed Aug. 9, 1966
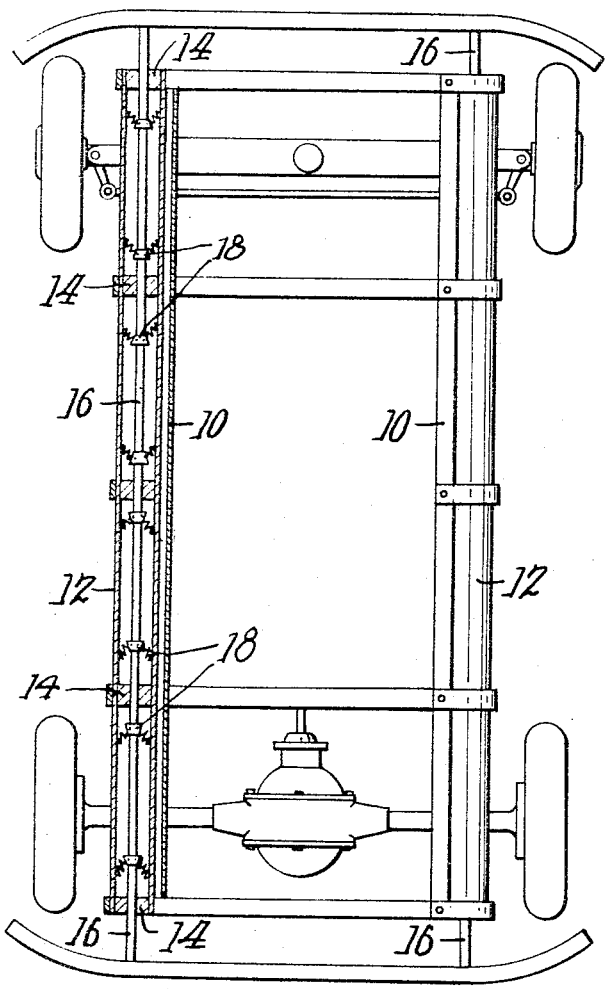
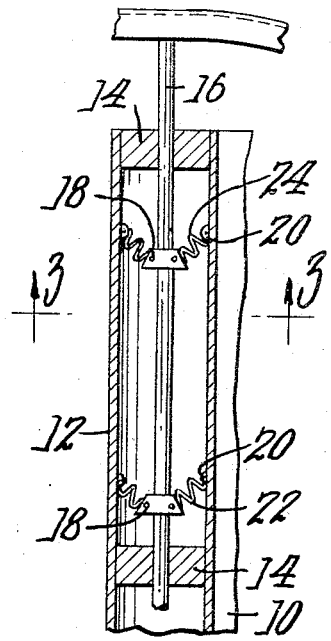
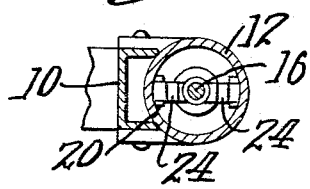
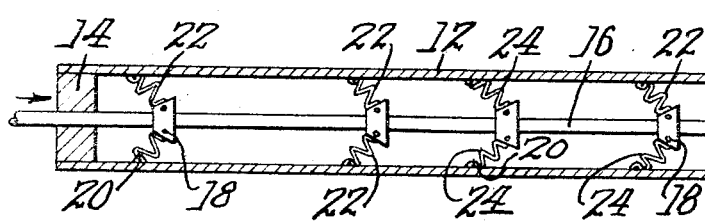
Inventor
Joseph V. Tavano, Sr.
By Charles P. Fay
Attorney 3,333,880
CRASH ABSORBING DEVICE
Joseph V. Tavano, Sr., 26 Whitney St.,
Milford, Mass. 01757
Filed Aug. 9, 1966, Ser. No. 571,257
1 Claim. (Cl. 293—30)

ABSTRACT OF THE DISCLOSURE

A shock-absorbing device for vehicles in order to prevent damage in the event of a front or a rear crash including fore-and-aft bumpers for the vehicle and solid rods connecting the bumpers extending from end to end of the vehicle, the rods being solidly fixed to the bumpers and mounted in slide bearings, together with heavy springs interposed between the rods on which the bumpers are mounted and the frame of the car, the springs being adapted to absorb the shock whether the shock is applied to the front bumper or the rear bumper.

---

This invention relates in general to crash or accident absorbing devices for vehicles. The principal object of the invention is to provide a rigid framework which extends from the rear bumper to the front bumper and forming a solid rectangular member which will serve to transfer or carry shock at either end of the vehicle all the way to the opposite end thereof.

This solid framework is not directly attached to the chassis of the car but instead is mounted in tubular members which are attached to the chassis of the car or to the main frame members of the vehicle and the tubular member contains slide bearings so that the end to end fore-and-aft crash rods are slidably mounted in the tubes. Then between the tubes and the rods there are mounted heavy springs which absorb the shock in certain defined directions as will become more apparent hereinafter.

Other objects and advantages of the invention will appear hereinafter.

Reference is to be had to the accompanying drawings in which:

FIG. 1 is a plan view showing a chassis of a motor vehicle with my invention in use;

FIG. 2 is an enlarged section showing details thereof;

FIG. 3 is a section on line 3—3 of FIG. 2, and

FIG. 4 is a view similar to FIG. 2 but showing an entire front spring section.

As illustrated in the drawings, the reference numeral 10, 10 indicates longitudinal channels or other kinds of irons forming the main part of the framework of the chassis of a vehicle. On these at the outside aspects thereof are mounted elongated tubes of relatively heavy material, these tubes being indicated at 12. Tubes 12 are welded to members 10 or made as a part thereof. Each tube is provided with a certain number of slide bearings as indicated at 14.

The tubes extend substantially the lengths of the chassis of the vehicle and each tube contains within it an elongated relatively heavy rod 16. These rods are mounted to slide in the slide bearings and extend from the ends of the tubes into a position where the front and rear bumpers may be mounted directly thereon.

The bumpers and the slide rods 16 comprise a single solid rectangular frame. There is no yielding member whatsoever from end to end of this frame and a crash on one bumper will have the shock thereof transmitted through the rods to the other bumper.

However I provide relatively heavy springs which may be in the nature of leaf or coil springs which are rigidly secured to the rods as indicated at 18 and also to the interior surfaces of the tubes as indicated at 20. These springs are bowed or V-shaped and they are provided with their apexes attached to the rods pointing in the directions shown. For instance, the springs as in the forward section, FIG. 4, at 20, 22, 24 must be opened up when a crash occurs for instance at the left of this figure with shock forces in the direction of the arrow. This is reversed at the rear of the vehicle, so that all springs at the rear have to open up or expand under shock from the rear.

By this construction it is believed that the shock of most accidents will be taken up in such a way as to substantially prevent injuries to the occupants of the vehicle because of the fact that the shock is not impressed on the frame or chassis of the vehicle but instead it is taken up by the rods 16 and the springs mounting the same, the shock of course extending all the way through these rods from end to end of the vehicle, distributing the shock force throughout, and therefore it will be seen that this invention provides a safety device of a high order.

Having thus described my invention and the advantages thereof, I do not wish to be limited to the details herein disclosed, otherwise than as set forth in the claim, but what I claim is:

A shock-absorbing device for vehicles comprising fore-and-aft bumpers, solid rods connecting said bumpers and extending from end to end of the vehicle, said rods and bumpers being solidly fixed to each other, slide bearings supporting said rods for sliding action with respect thereto, means mounting said slide rods on the chassis of the vehicle, springs interposed between the slide rods and the means mounting the slide rods on the chassis, said means comprising tubular members mounted on the frame members of the vehicle, the springs being in bowed form, the centers of which are secured to the slide rods and the ends of which are secured to the tubular members, the apexes of the bowed spring adjacent a bumper pointing away from the bumper so that under shock on the bumper the springs open and stretch.

References Cited

UNITED STATES PATENTS

| | | | |
|---|---|---|---|
| 846,599 | 3/1907 | Nicholson et al. | 293—68 |
| 1,691,398 | 11/1928 | Long | 293—30 X |
| 1,738,458 | 12/1929 | Sorce | 293—30 |
| 3,226,146 | 12/1965 | Behr | 293—30 |

FOREIGN PATENTS

| | | |
|---|---|---|
| 267,209 | 3/1927 | Great Britain. |

ARTHUR L. LA POINT, *Primary Examiner.*

H. BELTRAN, *Assistant Examiner.*